Dec. 26, 1933.   B. ENGELS   1,941,392
PROCESS AND APPARATUS FOR PRODUCING COMPOUND GLASS SHEETS
Filed Sept. 13, 1930

Inventor
BERNHARD ENGELS
By Dorsey & Cole
Attorney

Patented Dec. 26, 1933

1,941,392

UNITED STATES PATENT OFFICE 1,941,392

PROCESS AND APPARATUS FOR PRODUCING COMPOUND GLASS SHEETS

Bernhard Engels, Weisswasser, Germany

Application September 13, 1930, Serial No. 481,761, and in Germany September 23, 1929

2 Claims. (Cl. 49—17)

This invention has for its object an improved method and apparatus for mechanically and, if desired, also continuously producing compound glass sheets i. e. glass sheets or cylinders consisting of two or more layers of glass of different characteristics and especially for producing so called coated or wrapper glass.

Hitherto compound glass was produced mechanically in such a manner that the layers of the sheets were formed simultaneously or one layer was entirely formed and set and then coated with the glass forming the other layer. Each of these two layers must be strong enough to stand as an independent layer. Hitherto it was, however, not possible to produce a compound glass, in which the coating layer is so thin that it cannot stand itself as an independent layer.

In carrying out my invention I propose to form a band or cylinder from a bath of molten glass in any well known and approved process and I then apply thereto by flowing on the band or cylinder or on the root of same the glass which shall form the wrapper or coating.

The second layer is flowed to the band or cylinder in a layer-strength, which can be greater as the final layer-strength.

In its motion the primary layer, which leaves the bath in form of a band or cylinder, takes with it a thin layer from the glass for the second layer.

The strength of the single layers may be regulated by giving the single kinds of glass and also the primary layer and the coating layers different temperatures or different consistencies.

Of course the process is not limited to provide a primary layer only with one coating layer. It is also possible to advance to the primary layer two or more coating layers.

For instance I let flow the glass which shall form the wrapper or coating onto the band or cylinder or onto the root of same from a container which is provided with a proper conductor. This container may preferably be heated on its inner surface and cooled on its outer surface. Preferably also the surface which is opposite the band or cylinder or the root of same may be cooled.

Referring to the accompanying drawing in which corresponding parts are designated by corresponding marks of reference.

Figure 1:
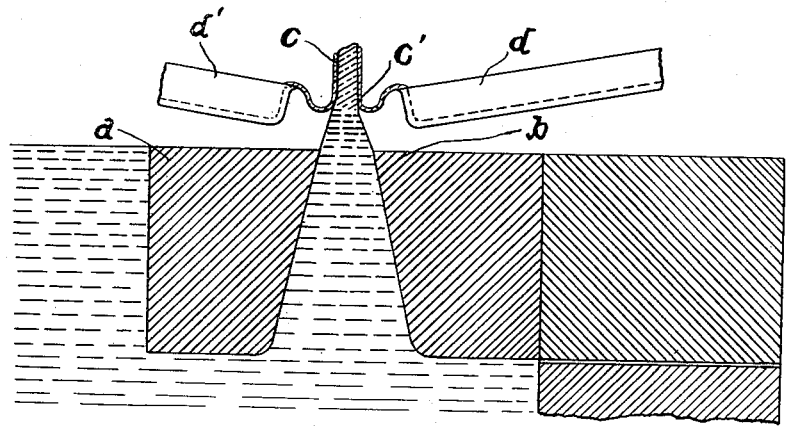
Fig. 1 illustrates the formation of a compound sheet according to my invention when the primary layer is formed by drawing upwardly through a slot.

Referring to Fig. 1, $a$ is a floater in a molten bath, it having a draw slot $b$ therein through which glass to form the primary layer $c$ is drawn, the draw being started by a suitable bait, as is well known.

Having its lower edge adjacent the layer $c$ as it is drawn upwardly is the container $d$ for the glass of the second layer, the edge of this container terminating at about the level at which the protuberance or swelling $c'$ at the mouth of the slot is reduced in thickness in the drawing process. The container $d$ may be either a flat slab down which the glass of the second layer flows or it may be hollowed, as shown in dotted lines, to serve as a reservoir for molten glass for such layer. In any event the glass for the second layer flows over the lower edge of the container onto one side of the sheet formed from the slot $b$ and applies thereto a layer coating. The fact that the sheet of the first layer has become sufficiently chilled to draw, and the fact that the glass from the second layer must be sufficiently fluid to flow, causes a marked difference of viscosity in the glass of the two layers at the time they are brought into contact with each other, and if the glasses are of similar composition, except for coloring matter, means that the two glasses have different temperatures at the time they are brought together.

Obviously, by placing a container $d'$ similar to that before described, on the side of the primary layer opposite to that on which is the container $d$, a layer of glass can be applied to that side of the primary layer; and hence a sheet consisting of three layers may be thus formed.

Figure 2:
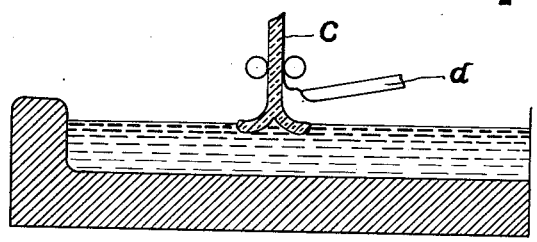
Fig. 2 shows the formation of a compound sheet according to my invention when the primary layer is drawn upwardly from the surface of a molten bath.

The process shown in Fig. 2 is similar, generally speaking, to that shown in Fig. 1, except in the manner in which the primary sheet is formed. Here the sheet is drawn directly from the surface of the molten bath, as is done in a well known process, and the glass layer is applied thereto immediately above the bath.

Figure 3:
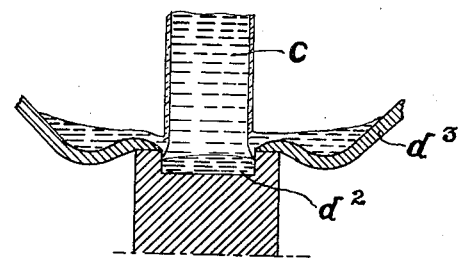
Figs. 3 and 4 illustrate the application of my invention to the formation of a drawn cylinder, which may be subsequently cut and flattened to form sheets.

In Fig. 3 my invention is shown as applied to the drawing of a cylinder $c$. In this case the container $d^2$ has a circular central opening therein through which the cylinder is drawn, the opening being surrounded by an annular trough $d^3$ in which is contained molten glass to form the second or applied layer, glass being kept at such a level in such trough as to cause it to feed over the edge of the annular opening onto the cylinder as formed.

Figure 4:
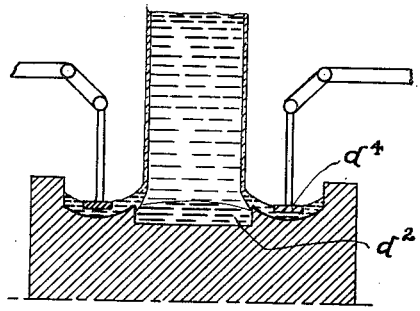

In Fig. 4 the construction is the same as shown in Fig. 3, except that the molten glass is fed from the container $d^2$ at the desired rate by displacing rings $d^4$, which may be immersed in the containers.

The manufacture of compound glass or coated glass by the process according to my invention is of course not limited to the forms of the invention herewith shown and described, but it is possible to combine this process with each process which has for its purpose to form glass-bands from the molten mass, and it does not make any difference whether or not these glass-bands are formed by means of nozzles or whether they are formed by means of slots and in what direction they pass off.

Having thus described my invention what I claim and desire to secure by U. S. Letters Patent is:

1. The hereinbefore described method of producing a sheet formed of a plurality of layers of different glasses, which comprises drawing a layer of glass in sheet form upwardly from a bath, flowing onto the upwardly moving layer of glass before it has set, another layer of glass and continuing the upward draw of the first layer with the glass of the second layer thereon.

2. In an apparatus for forming sheet glass, the combination with a bath of molten glass, of means for drawing upwardly therefrom a sheet of glass, and means for delivering a layer of molten glass onto the surface of the upwardly moving sheet of glass between the bath and the drawing means.

BERNHARD ENGELS.